May 4, 1965 C. C. CUTLER 3,182,326

ANTENNA STRUCTURES FOR COMMUNICATION SATELLITES

Filed Dec. 6, 1960 2 Sheets-Sheet 1

INVENTOR
C. C. CUTLER
[signature]
ATTORNEY

INVENTOR
C. C. CUTLER
BY [signature]
ATTORNEY 3,182,326
Patented May 4, 1965

3,182,326

ANTENNA STRUCTURES FOR COMMUNICATION SATELLITES

Cassius C. Cutler, Gillette, N.J., assignor to Bell Telephone Laboratories, Incorporated, New York, N.Y., a corporation of New York Filed Dec. 6, 1960, Ser. No. 74,183
10 Claims. (Cl. 343—100)

This invention relates to antenna systems and more particularly to antennas arranged for use in and with satellite vehicles to adapt such vehicles for use as repeater stations in satellite communication systems.

While many communication systems utilizing earth satellites as repeater stations have been proposed, these systems fall into two general classes; those involving passive repeaters and those involving active repeaters. Considerations of efficiency, system cost, and channel capacity indicate substantial advantages in the use of systems employing active repeaters. In a typical system of this kind, the satellite vehicle serves as the relay station of a line-of-sight communication system and is equipped with transmitting and receiving equipment by means of which a signal from a first station may be detected, increased in level, and radiated directively toward another station of the system. It is obvious that in a system of this kind, the repeater station must be furnished with antennas which are either isotropic in nature or which are oriented with respect to the terminal stations to promote transmission efficiency.

It is thus seen that there are two basic problems involving antenna systems for such applications. The first of these involves provisions for orienting either the vehicle as a whole or the antennas with respect to the vehicle so that the radiation patterns of the antennas are directed appropriately with respect to the directions in which communication is to be undertaken. The second problem results from the fact that the vehicle itself must be designed in such a way that it may be launched as a compact unit from a rocket carrier and made ready for operation while in orbit. This latter problem represents a considerable limitation on the types of antennas which may be employed in that those having projecting elements or elements which must be erected after the vehicle has reached its orbital station are subject to, at worst, structural damage or failure of operation and, at least, to the difficulties attendant upon packaging the satellite vehicle for its trip to its eventual orbit.

An additional consideration in the design of an antenna system for a satellite vehicle intended for the purposes referred to relates to the necessity for providing separate transmitting and receiving channels and at the same time suppressing or substantially eliminating cross-coupling or cross-feed between these channels.

It is accordingly the object of the present invention to simplify antenna structures to be employed in satellite vehicles and to accomplish such simplification without incurring a penalty in the form of cross-feed between the transmitting and receiving channels of the repeater station which the satellite vehicle is to provide.

In accordance with the above objects, the antenna system of the invention is designed to form an integral part of an essentially spherical satellite vehicle. Basically, the system comprises a pair of peripheral conical horn antennas which are contained within and intersect the envelope of the spherical vehicle in a pair of parallel slot-like openings. One of these horns serves as the transmitting antenna and the other as the receiving antenna. Arrangements, including an extended parallel-plate region and a polarizer, are provided for each antenna to convert energy therein to circularly polarized wave form. Additional means are provided for controlling the relative phase of the wave reaching the periphery of the antenna to produce a spiral wave front at that point. These arrangements provide a radiation pattern which is appropriate to the kind of orientation system which may be employed in a spherical satellite vehicle and which permits radiation of electromagnetic wave energy in a form calculated to suffer the least degradation in the transmission path and at the same time to afford minimum cross-feed between the transmitting and receiving sections of the repeater.

The above and other features of the invention will be considered in the following specification taken in connection with the drawing in which.

Figure 1:
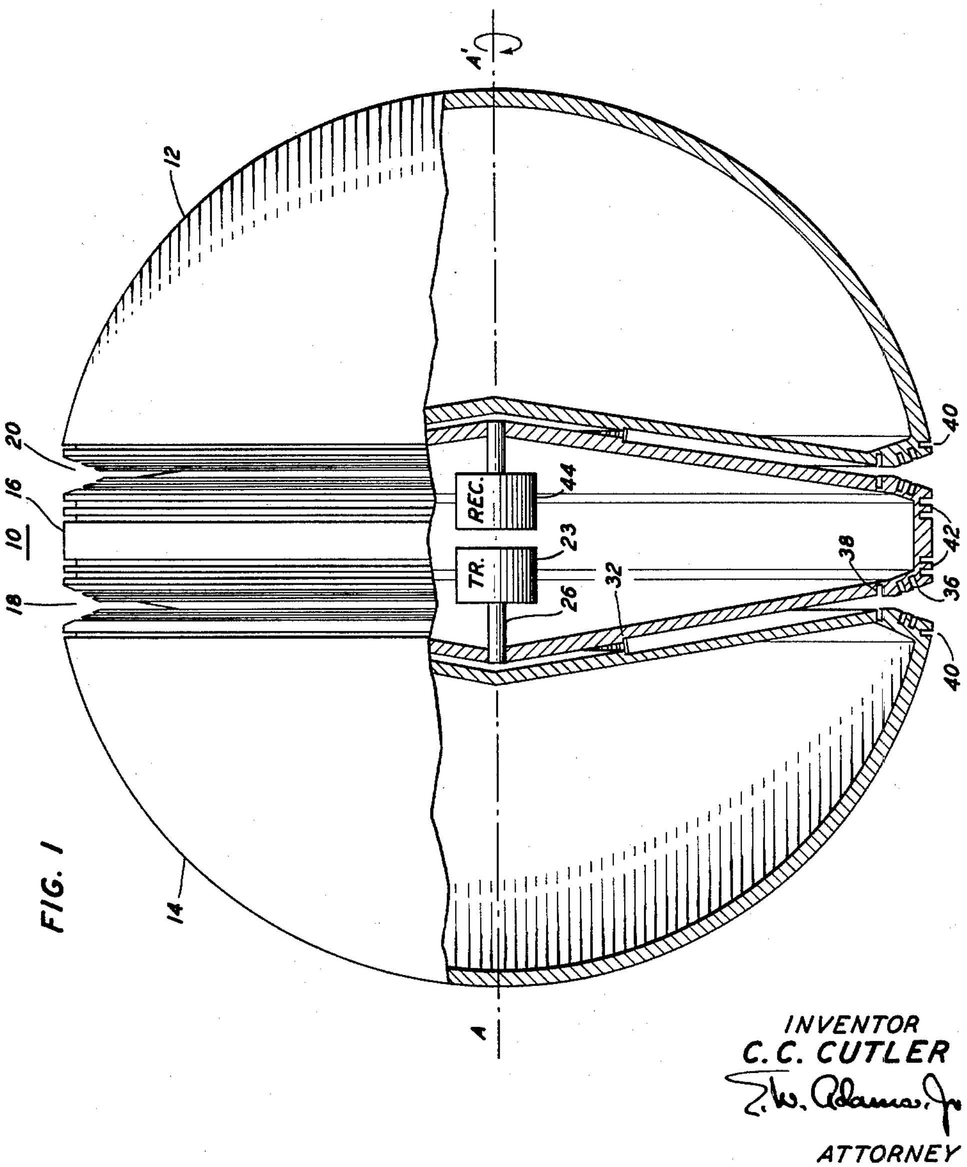
FIG. 1 is a plan view of a spherical satellite vehicle equipped with paired antennas, according to the invention, shown partly in section to facilitate understanding of the antenna structures.

As shown in FIG. 1, an essentially spherical body 10 is taken as illustrative of a typical satellite vehicle. Ordinarily, such a body is made of light gauge, lightweight metal or a metal-plastic sandwich material and serves as the strength member which supports all of the remaining elements of the radio repeater station. Such a spherical vehicle may be considered as comprising hemispherical body portions 12 and 14, supported and joined by a diametral bulkhead portion 16. If the mass of the vehicle is concentrated in bulkhead portion 16 and if it is distributed more or less symmetrically within this portion, then the greatest moment of inertia of the vehicle will be about the axis passing through the center of bulkhead portion 16 and normal to the plane thereof. It is well known that a vehicle or body launched spinning about the axis of the greatest moment of inertia and with that axis normal to the plane of the orbit in which the vehicle is to travel will remain oriented in this manner so long as the spin of the vehicle about the defined axis is maintained. In the arrangement shown in FIG. 1, it is assumed that the mass of the vehicle is concentrated in the manner considered above with the result that the satellite vehicle may be launched spinning about the axis AA' and with this axis normal to the plane of the orbit in which the vehicle is to travel.

The form of orientation just considered is relatively crude in nature and requires that the antenna systems employed in fitting the vehicle for use as an active repeater station either provide isotropic radiation patterns or radiation patterns which are symmetrical with respect to the rotational axis. An appropriate antenna pattern is thus seen to be essentially toroidal and such pattern is available through the use of the well-known biconical horn-type antenna. It is desirable and, according to the invention, contemplated therefore, that essentially biconical horn antennas be provided for both the transmitting and receiving channels of the repeater station. As shown in FIG. 1, these horns are formed by peripheral flared openings terminating in the surface of the satellite vehicle and defined by the opposing surfaces of hemispherical portions 12 and 14 and the faces of bulkhead portion 16. While, as will appear hereinafter, the apexes of the two conical surfaces forming the horn are flattened to permit desired modifications in the feed, the structure described performs in the same way as a more conventional biconical horn and will be referred to as such in the following description.

Figure 2:
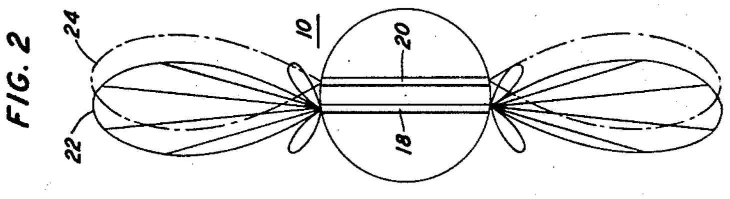
FIG. 2 is a schematic diagram illustrating the radiation patterns to be expected from the antenna system of FIG. 1.

As shown in FIG. 2, satellite vehicle 10 is provided with a transmitting biconical horn antenna 18 and a receiving antenna 20 of identical design. The radiation pattern of such a biconical horn comprises a strong major lobe (the width of which may be determined by the spacing of the opposed faces forming the horn opening) which falls in the plane of the slot in the surface of the satellite vehicle. This radiation pattern is indicated in FIG. 2, which illustrates not only the major lobe 22 but also the location of the minor lobes which may be expected. In addition, the major lobe 24 is shown in dashed lines for receiving antenna 20. It will be recognized that such antenna patterns are appropriate to the mode of vehicle orientation discussed above.

In the design of antennas for use in satellite communications, however, two additional factors are involved and are provided for in the arrangement of the invention. The first of these relates to the fact that as the satellite travels in orbit, it will be seen by receiving stations from many angles. Thus, if the satellite antenna is designed for linearly polarized waves, signals therefrom will reach the receiver location with variable polarization. In some cases, also, the ionosphere may produce variable rotation of the plane of polarization of radio waves passing therethrough. These factors would suggest the use of circularly polarized waves as an appropriate means of transmission between the satellite vehicle and the terminal stations. Such waves, however, are not ordinarily produced by a biconical horn antenna and, accordingly, means are provided which modify such an antenna to fit it for this particular use.

A further problem involves the necessity of isolating the transmitting and receiving channels of the repeater station so that the relatively weak waves received at the repeater from a base station will not be interfered with and swamped by the relatively high level waves radiated therefrom. Arrangements for reducing such cross-feed between the transmitting and receiving systems also are provided according to the invention.

For purposes of discussion, it may be assumed that transmitting and receiving antennas 18 and 20, respectively are identical and further description will accordingly be limited to transmitting antenna 18. It is to be understood, however, that many of the advantages of the invention may be obtained when only one of the antennas 18 or 20 is provided with the specific arrangements now to be described.

As pointed out above, transmitting antenna 18 comprises a modified biconical horn formed by a flared slot located in a substantially diametral plane of the satellite vehicle and intersecting the surface thereof to provide a circumferential slot. Although no means are shown for supporting hemispherical portions 12 and 14 of the antenna with respect to central bulkhead portion 16, it will be understood that skin portions of dielectric material may overlie the slots of antennas 18 and 20, or partitions constructed of dielectric material or otherwise rendered non-interfering to the electromagnetic waves within the antennas, may be provided for the purpose of maintaining the elements of the vehicle in relative position.

As noted above, it is desired to radiate electromagnetic wave energy from slot antenna 18 with circular polarization. This may be accomplished in a variety of ways but in a preferred arrangement, as shown in FIG. 1 and further detailed in the simplified showing in the basic antenna structure of FIG. 3 of the drawing, energy from a transmitter 23 is conducted to biconical horn 18 by way of an extended parallel-plate region. This parallel-plate region is defined by the opposed surfaces of hemispherical portion 14 and bulkhead 16 and is best shown in simplified form in FIG. 3. Here, for purposes of description, the parallel-plate region is shown as flat rather than as slightly conical, as in FIG. 1 of the drawing, but as will be apparent from the following, this difference in structure is not material to the operation of the antenna, according to the invention, and is employed in the arrangement of FIG. 1 only because it simplifies the construction of the satellite vehicle by permitting, for example, the use of conducting mesh rather than solid conducting sheets for the surface defining elements.

Figure 3:
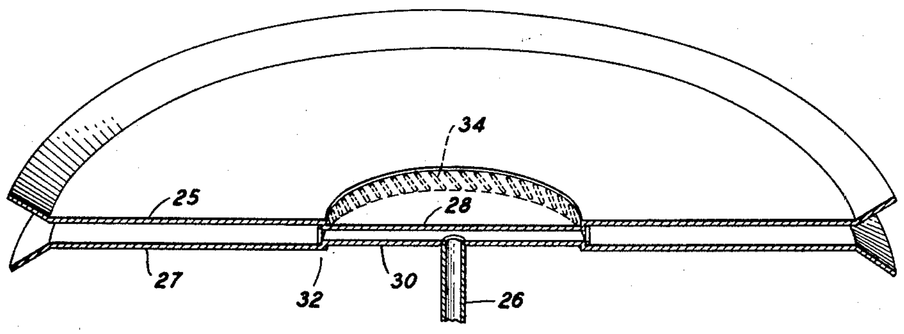
FIG. 3 is a sectioned perspective diagram illustrating in simplified form the basic elements of the antenna system of the invention.

As shown in FIG. 3, the diametral surface 25 of hemispherical portion 14 is disposed in opposition to and forms a parallel-plate region with the surface 27 of bulkhead portion 16. It will be noted that the spacing of these conducting surfaces differs over the path from the center of the vehicle at which the transmitter equipment is located to the periphery of the vehicle at which the biconical horn opening is found. Thus, electromagnetic wave energy from transmitter 23 is conducted by a wave guide 26 and is launched within a parallel-plate region of a first spacing and defined by portions 28 and 30 at the centers of conducting sheets 25 and 27, respectively. At a chosen radius out from the point of feed at which wave guide 26 joins portion 30, the spacing of the parallel plates is stepped to provide a greater width to the parallel-plate region. This step appears, for example, at point 32 in the transmitting antenna. At the extreme periphery of the parallel plates 25 and 27, the plates are flared outward to provide a horn mouth so that the entire structure comprises a modified biconical horn.

It will be recalled that it is desired to launch or receive waves with circular polarization. Accordingly, waves applied to the central parallel-plate region require conversion to circularly polarized form and must be maintained in this form as they are conducted to and radiated from the biconical horn opening. To this end, the spacing between parallel-plate portions 28 and 30 is made less than one-half wavelength at the frequency of the wave to be transmitted and a 45 degree grid 34 is employed to separate the central parallel-plate region from the other parallel-plate region and extends about the step between the two regions, as shown best in FIG. 3 of the drawing. This grid, or grating, which may be formed of a plurality of parallel wires, is seen by waves emanating from the central feed point as a 45 degree grating and assists in converting such energy to circularly polarized form, as pointed out hereafter. At the same time, the sudden step in the spacing of the parallel plates serves to match the impedance of the radiating horn to the feed and compensate for the impedance discontinuity introduced by the 45 degree polarizer just described.

By appropriate choice of the spacing of the parallel plates and the radii of the two different regions defined by the step and the polarizing grid, it is possible to insure that radiation from wave guide 26 will reach the peripheral horn as a circularly polarized wave. It is believed preferable, however, to insure that circularly polarized waves will be radiated despite any variations in the quantities just mentioned which may otherwise produce elliptical polarization of the waves as they travel from the polarizing grating to the horn openings. This may be accomplished by lining the inner faces of the flared horn openings with dielectric material or, and as shown in FIG. 1 of the drawing, by providing annular corrugations or slots in these faces so that the normal cosinusoidal distribution of the polarization component parallel to the aperture is matched by a cosinusoidal distribution of the polarization component perpendicular thereto. Such corrugations or slots are indicated at 36, for example, for transmitting antenna 18. An additional slot 38 is provided at the point at which the horn opening joins the parallel-plate region and serves primarily for the purpose of matching impedances. In addition to all of these slots or corrugations it may be desirable to provide corrugations or grooves parallel to the antenna slot openings in the surface of the satellite vehicle to minimize cross-coupling between the transmitting and receiving antennas. Such slots are shown, for example, at 40 and 42 in FIG. 1 of the drawing.

In the antenna thus far described, energy from the transmitter may be launched in the central parallel-plate region and converted to circularly polarized form for radiation from the peripheral horn opening. An identical antenna 20 may be provided for receiver 44, as indicated in FIG. 1 of the drawing. Cross-coupling between antennas 18 and 20 is minimized, according to the invention, by providing for a relative phase shift in the wave front conducted between at least one of the horn antennas and the associated transmitter or receiver. It will be recognized that if the simplified antenna of FIG. 3 is so excited that the phase of the wave front reaching one-half of its circumference is opposite to that reaching the other half of its circumference, any energy coupled from such an antenna to an identical antenna parallel thereto will cancel along the axis of symmetry. Since it is desired, however, to provide for uniform radiation about the entire periphery of the antenna, means are provided, according to the invention, for producing a gradual and continuous 360 degree shift in relative phase of the energy reaching one of the antenna openings; for example, the slot opening of antenna 18 from transmitter 23. Stated in another way, the wave launched from the transmitter is acted upon in such a way as to produce a spiral wave front rather than the usual concentric circle wave front which would normally be radiated from such an antenna system.

The simplest way of accomplishing this result is to launch waves from the transmitter or to couple waves to the receiver by circular wave guides as, for example, wave guide 26, and to excite this wave guide with a circularly polarized $TE_{11}$ mode. Consideration of this mode of propagation will indicate that waves emanating from the feed wave guide into the parallel-plate region will progress outwardly with a spiral wave front, which is just the condition required. It will be understood that a wave launched from horn antenna 18 with a spiral wave front, with the spiral progressing in one direction, will not be accepted by a similar antenna aligned coaxially and designed for concentric waves or for waves which would spiral inward with the same sense. In the case of the geometry shown in FIG. 1, if transmitter 23 launched a right-hand circularly polarized wave into wave guide 26, the receiver would be adjusted to receive left-hand polarization from the wave guide associated with it, and would reject the signal which would arrive from the local transmitter. Thus, it will be seen that destructive interference to waves coupled to antenna 20 from antenna 18 will occur, thereby minimizing or substantially eliminating cross-feed between the two antennas. As suggested above, such a result will obtain when only antenna 18 is coupled to its associated transmitter or when only antenna 20 is coupled to its associated receiver for the transmission of a spirally disposed wave front. The effect may, however, be enhanced if both antennas are coupled to the associated electronic equipment for waves with a spiral wave front of the proper sense.

What is claimed is:

1. In a communication system having transmitting and receiving antennas located in close proximity and having circular radiation patterns, the main lobes of which lie in parallel planes, transmitting and receiving means coupled respectively to said antennas, and means for preventing cross-coupling by way of said antennas between said transmitting and receiving means comprising means coupling said transmitting means and its associated antenna to launch electromagnetic waves with a spiral wave front from said antenna.

2. In a communication system, first and second biconical antennas having radiation patterns lying in closely adjacent parallel planes, transmitting and receiving means associated respectively with said first and second antennas, and means for preventing cross-coupling between said transmitting and receiving means by way of said antennas comprising means interconnecting at least one of said antennas and its associated transmitting or receiving means to produce a 360 degree relative phase variation about the periphery of said antenna in the waves launched therein.

3. In a communication system, a utilization circuit, a biconical antenna and means coupling said antenna to said utilization circuit to interconnect said utilization circuit and a transmission medium, means within said coupling means for converting electromagnetic waves therein to circularly polarized waves, and means within said biconical antenna for preserving the circularly polarized nature of waves coupled thereto.

4. In a communication system, first and second biconical antennas, transmitting and receiving means, means for coupling energy between said antennas and said transmitting and receiving means, respectively, for circularly polarized waves, and means for minimizing cross-feed between said transmitting and receiving means by way of said antennas.

5. In an antenna for high frequency waves, conducting means defining a biconical radiating region and feed means coupling electromagnetic wave energy to said region with a 360 degree phase shift about the periphery of said region, said coupling means comprising a parallel-plate region lying concentrically within said biconical region and a circular waveguide feed located axially of said plate region and coupling energy thereto in the $TE_{11}$ mode.

6. In an antenna system for high frequency waves, conductive surfaces defining a biconical radiating region having a feed point at the common apexes of said region, means for launching electromagnetic waves at said feed point with a 360 degree shift in relative phase about the periphery of said region, and means located on said conductive surfaces to convert energy launched at said feed point to circularly polarized waves.

7. In an antenna system for high frequency waves, conductive surfaces defining a biconical radiating region having a feed point at the common apexes of said region, means for launching electromagnetic waves at said feed point with a 360 degree shift in relative phase about the periphery of said region, and means located on said conductive surfaces to convert energy launched at said feed point to circularly polarized waves, said means comprising a plurality of concentric slots formed in said conductive surfaces in planes parallel to the bases of the cones defined thereby to convert energy coupled to the biconical region to uniform cosine distribution.

8. In an antenna for high frequency waves, an extended parallel-plate region terminated in a flared peripheral section to form a biconical horn, means for launching waves within said parallel-plate region to reach said peripheral biconical horn with a 360 degree variation of relative phase about the periphery thereof, means also within said parallel-plate region for converting waves from said launching means to circularly polarized waves, and means within the flared section of said horn for converting waves incident thereupon for radiation as circularly polarized waves.

9. In an antenna system for high frequency waves, an extended parallel-plate region terminated in a flared peripheral section to form a biconical horn, means for launching waves within said parallel-plate region to reach said peripheral form with a spiral wave front, means also within said parallel-plate region for converting waves from said launching means to circularly polarized waves, and means comprising a stepped portion in said parallel-plate region for matching the impedance of said launching means to that introduced by said wave polarizer means.

10. In an antenna for high frequency waves, an extended parallel-plate region defined by a pair of conducting plates of a first separation, a second contiguous parallel-plate region surrounding said first region and defined by a conducting surface having a second separation larger than the separation of the plates of said first region, the plates of said second region being terminated at their outer periphery in a flared section to form a peripheral biconical horn, means for launching waves within said first parallel-plate region to reach said peripheral biconical horn with a 360 degree variation of relative phase about the periphery thereof, and means acting in cooperation with the change in separation of said regions for converting waves from said launching means to circularly polarized waves comprising a series of conducting posts of quarter-wave spacing disposed about the interface between said first and second regions to form a 45 degree grating intercepting waves traveling from said first region through said second region to said biconical horn.

References Cited by the Examiner

UNITED STATES PATENTS

| | | | |
|---|---|---|---|
| 2,412,320 | 12/46 | Carter | 343—772 |
| 2,532,551 | 12/50 | Jarvis | 343—774 |
| 2,771,605 | 11/56 | Kirkman | 343—771 |

FOREIGN PATENTS

| | | |
|---|---|---|
| 805,997 | 12/58 | Great Britain. |

CHESTER L. JUSTUS, *Primary Examiner.*

KATHLEEN CLAFFY, *Examiner.*